(12) United States Patent
Sahinbas et al.

(10) Patent No.: US 10,727,928 B2
(45) Date of Patent: Jul. 28, 2020

(54) APPARATUS FOR ESTIMATING A DIRECTION OF ARRIVAL AND CORRESPONDING METHOD

(71) Applicant: Fraunhofer-Gesellschaft zur Foerderung der angewandten Forschung e.V., Munich (DE)

(72) Inventors: Burak Sahinbas, Erlangen (DE); Lars Weisgerber, Ebersbach-Neugersdorf (DE); Mario Schuehler, Effeltrich (DE); Rainer Wansch, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/359,935

(22) Filed: Mar. 20, 2019

(65) Prior Publication Data
US 2019/0372651 A1    Dec. 5, 2019

Related U.S. Application Data

(63) Continuation of application No. PCT/EP2016/072539, filed on Sep. 22, 2016.

(51) Int. Cl.
*H04W 4/00*     (2018.01)
*H04B 7/08*     (2006.01)
(Continued)

(52) U.S. Cl.
CPC ............ *H04B 7/086* (2013.01); *H01Q 21/24* (2013.01); *H04B 7/0469* (2013.01); *H04B 7/0617* (2013.01)

(58) Field of Classification Search
None
See application file for complete search history.

(56) References Cited

U.S. PATENT DOCUMENTS

| | | | | |
|---|---|---|---|---|
| 5,608,411 A | * | 3/1997 | Rose | G01S 3/48 342/362 |
| 6,127,974 A | * | 10/2000 | Kesler | G01S 3/46 342/417 |

(Continued)

OTHER PUBLICATIONS

Foutz, Jeffrey et al., "Narrowband Direction of Arrival Estimation for Antenna Arrays", ser. Synthesis Lectures on Antennas #8. Morgan & Claypool, 2008, 2008.

(Continued)

*Primary Examiner* — Clemence S Han
(74) *Attorney, Agent, or Firm* — Michael A. Glenn; Perkins Coie LLP

(57) ABSTRACT

An apparatus for estimating a direction of arrival includes an antenna, a beamforming network, and an evaluator. The antenna is configured to receive signals, is circularly polarized, and includes a plurality of different radiation patterns. The beamforming network is configured to provide based on signals received by the antenna decomposed signals that are received by associated radiation patterns of the plurality of radiation patterns. The evaluator is configured to estimate the direction of arrival based on the decomposed signals and based on information describing signal receiving characteristics of the antenna. The invention also refers to a corresponding method.

14 Claims, 13 Drawing Sheets

(51) Int. Cl.
      *H01Q 21/24*    (2006.01)
      *H04B 7/0456*   (2017.01)
      *H04B 7/06*     (2006.01)

(56) References Cited

U.S. PATENT DOCUMENTS

| | | | | |
|---|---|---|---|---|
| 6,195,064 | B1* | 2/2001 | Andrews | H01Q 21/24 |
| | | | | 342/361 |
| 8,730,873 | B2* | 5/2014 | Nikula | H04B 7/086 |
| | | | | 370/252 |
| 2002/0158801 | A1* | 10/2002 | Crilly, Jr. | G01S 13/74 |
| | | | | 342/378 |
| 2007/0205955 | A1* | 9/2007 | Korisch | H01Q 1/246 |
| | | | | 343/853 |
| 2008/0012710 | A1* | 1/2008 | Sadr | G06K 7/0008 |
| | | | | 340/572.1 |
| 2008/0181174 | A1* | 7/2008 | Cho | H04B 7/0857 |
| | | | | 370/329 |
| 2011/0181472 | A1* | 7/2011 | Tokuhiro | G01S 3/146 |
| | | | | 342/417 |

OTHER PUBLICATIONS

Gotsis, Konstantinos A. et al., "On the direction of arrival (doa) estimation for a switched-beam antenna system using neural networks", IEEE Transactions on Antennas and Propagation, vol. 57, No. 5 pp. 1399-1411, May 2009, May 2009, pp. 1399-1411.

Han, Yong et al., "Joint DOA and polarization estimation for unequal power sources based on reconstructed noise subspace", Journal of Systems Engineering and Electronics, vol. 27, No. 3, pp. 501-513, Jun. 2016, Jun. 2016, pp. 501-513.

Maddio, Stefano et al., "A closed-form formula for RSSI-based DoA estimation with Switched Beam Antennas", 2015 European Radar Conference (EURAD), EUMA, (Sep. 9, 2015), doi:10.1109/EURAD.2015.7346307, pp. 341-344, Sep. 9, 2015, pp. 341-344.

Maddio, Stefano et al., "Direction of Arrival estimation of an arbitrary oriented targets by a highly directive antenna and coarse RSSI data", Microwave Conference (EUMC), 2012 42nd European, IEEE, (Oct. 29, 2012), ISBN 978-1-4673-2215-7, pp. 140-143, Oct. 29, 2012, pp. 140-143.

Muehldorf, E. I. et al., "Polarization Mismatch Errors in Radio Phase Interferometers", IEEE Transactions on Aerospace and Electronic Systems, IEEE Service Center, Piscataway, NJ, US, (Mar. 1, 1972), vol. AES-10, No. 2, ISSN 0018-9251, pp. 135-141, Mar. 1, 1972, pp. 135-141.

Schmidt, Ralph O., "Multiple emitter location and signal parameter estimation", IEEE Transactions on Antennas and Propagation, vol. 34, No. 3, pp. 276-280, Mar. 1986, Mar. 1986, pp. 276-280.

Sheng, W X. et al., "Super-resolution DOA estimation in switch beam smart antenna", in Proc. 5th Int. Symp. Antennas, Propagation and EM Theory ISAPE 2000, Aug. 2000, pp. 603-606, Aug. 2000, pp. 603-606.

Weisgerber, Lars et al., "Antenna concepts for DoA estimation in traffic scenarios", Antenna concepts for DoA estimation in traffic scenarios, in Proc. IEEE-APS Tropical Conf. Antennas and Propagation in Wireless Communications (APWC), Aug. 2014, pp. 423-426, Aug. 2014, pp. 423-426.

Weisgerber, Lars et al., "Multibeam antenna array for RFID applications", in 2013 European Microwave Conference (EuMC), Nuremberg, Germany, Oct. 10-16, 2013, pp. 84-87, Oct. 10, 2013, pp. 84-87.

* cited by examiner

APPARATUS FOR ESTIMATING A DIRECTION OF ARRIVAL AND CORRESPONDING METHOD

CROSS-REFERENCES TO RELATED APPLICATION

This application is a continuation of copending International Application No. PCT/EP2016/072539, filed Sep. 22, 2016, which is incorporated herein by reference in its entirety.

The present invention relates to an apparatus for estimating a direction of arrival. Further, the invention relates to a method for estimating a direction of arrival.

BACKGROUND OF THE INVENTION

Direction-of-arrival (DoA) estimation of a signal emitted by a source or signal source of unknown location involves in the state of art an receive antenna array. Relying on the delay the signal is received amongst the antennas, a conclusion on the direction of the source can be drawn.

Not only the location of the signal source, but usually also the source orientation concerning the emission of signals is unknown. Thus, the polarization of the source signal can be arbitrarily inclined with respect to the receive array. Therefore, receive arrays of linearly polarized elements are usually deployed, because the phase difference amongst the elements is preserved for varying source inclination. This, however, can cause polarization mismatches, possibly leading to weak receive signals, whose direction of arrival cannot be accurately estimated.

Circularly polarized receive antennas do not suffer from polarization losses caused by inclined sources, assuming a linearly polarized source signal. Yet because of the limited axial-ratio beam width, which is displayed by a circularly polarized antenna, the phase difference amongst the elements varies with varying source inclination (see FIG. 1).

The scientific community has been investigating various antenna arrays and concepts to increase the accuracy of direction finding (DF).

This includes approaches using multibeam antennas (MBA) [2, 3]. Typically these antennas are linearly polarized and so are the signal sources. Thus, even if the signal source is arbitrarily oriented, the phase of the received signals stays mostly constant for a given impinging angle [4]. This allows for estimating of the DoA without considering source inclination, at the expense of a reduced estimation performance caused by polarization mismatches.

To achieve a DoA estimation performance being independent of the source orientation, a circularly polarized direction finding antenna is advantageous. However, for such an antenna, the received signal phases vary with changing signal source inclination, due to the limited axial ratio beamwidth.

There is a variety of methods for direction finding such as subspace-based methods, e.g. MUSIC [5]. Amongst all methods, the accuracy strongly depends on the set of steering vectors used and how accurate those represent the antenna characteristics. This includes polarization and the inclination of the source with respect to the antenna. As abovementioned, polarization mismatch causes inaccurate DoA estimates.

To cope with polarization mismatch, receive antenna arrays with dual polarization can be used. These arrays have different steering vectors for different source inclination and are therefore referred as polarization sensitive arrays [6]. Each element provides two signals, one for the first polarization and one for the second polarization. A set of two orthogonal polarization is typically used, e.g., linear vertical and linear horizontal polarization or right handed circular and left handed circular polarization (RHCP & LHCP). This, however, doubles the implementation effort, as twice as many signal branches are needed compared to an array supporting one polarization. Hence, an array supporting a single polarization only is advantageous in practice.

SUMMARY

According to an embodiment, an apparatus for estimating a direction of arrival may have: an antenna, a beamforming network, and an evaluator, wherein the antenna is configured to receive signals, wherein the antenna is circularly polarized, wherein the antenna includes a plurality of different radiation patterns, wherein the beamforming network is configured to provide based on signals received by the antenna decomposed complex signals that are received by associated radiation patterns of the plurality of radiation patterns, wherein the evaluator is configured to use the amplitude and phase response of the different radiation patterns to estimate the direction of arrival and an inclination of the signal source relative to the antenna based on the decomposed complex signals and based on information describing signal receiving characteristics of the antenna, and wherein the information describing signal receiving characteristics of the antenna includes a set of steering vectors depending on angles describing the position of a signal source emitting the signals received by the antenna relative to the antenna and depending on an angle describing an inclination of a polarization of the signal source relative to the antenna.

According to another embodiment, a method for estimating a direction of arrival may have the steps of: receiving signals emitted by a signal source with a circularly polarized antenna including a plurality of different radiation patterns, providing based on the received signals decomposed complex signals that are received by associated radiation patterns of the plurality of radiation patterns, and using the amplitude and phase response of the different radiation patterns to estimate the direction of arrival and an inclination of the signal source relative to the antenna based on the decomposed complex signals and based on information describing signal receiving characteristics of the antenna, and wherein the information describing signal receiving characteristics of the antenna includes a set of steering vectors depending on angles describing the position of a signal source emitting the signals received by the antenna relative to the antenna and depending on an angle describing an inclination of a polarization of the signal source relative to the antenna.

The object is achieved by an apparatus for estimating a direction of arrival. The apparatus comprises an antenna, a beamforming network, and an evaluator. The antenna is configured to receive—especially electromagnetic—signals, the antenna is circularly polarized, and the antenna comprises a plurality of different radiation patterns. The beamforming network is configured to provide based on signals received by the antenna decomposed signals that are received by associated radiation patterns of the plurality of radiation patterns. Further, the evaluator is configured to estimate the direction of arrival based on the decomposed signals and based on information describing signal receiving characteristics of the antenna.

The apparatus comprises an antenna for receiving signals from the signal source. The antenna is circularly polarized and has accordingly just one circular polarization. The antenna comprises a plurality of different radiation patterns that allow to receive a signal emitted by the signal source with different spatial distributions of the sensitivity for receiving electromagnetic signals. Each radiation pattern has a specific spatial distribution for receiving signals. Hence, with the different radiation patterns a signal of the signal source is received with various different spatial sensitivity for—especially electromagnetic—signals. The beamforming network allows to decompose the received signals into decomposed signals that are associated with the different radiation pattern. Hence, each decomposed signal is received with a radiation pattern of the plurality of available radiations patterns. In an embodiment, the radiation patterns refer to beams of the antenna. Finally, the evaluator estimates the direction of arrival based on the decomposed signals and based on information describing the signal receiving characteristics of the antenna. The information also refers to the different radiation patterns of the antenna. Thus, the apparatus is configured to estimate the direction of arrival based on received signals that are emitted by a signal source.

In an embodiment, the apparatus is configured to estimate additionally the polarization of the signal source. In an embodiment, the estimation of the polarization—or: the inclination of the polarization—is done by using only a single polarization by applying discrete reference inclination values as will be explained in the following.

In an embodiment, the apparatus is especially configured to estimate the direction of arrival based on signals emitted by a signal source that is linearly polarized.

In an embodiment, the antenna is either right hand circularly polarized or left hand circularly polarized.

According to an embodiment, the antenna comprises a plurality of antenna elements. The antenna elements of the plurality of antenna elements comprise different radiation patterns which are the basis for the plurality of radiation patterns of the antenna. Further, the beamforming network is configured to provide the decomposed signals so that the decomposed signals are received with radiation patterns of individual antenna elements or with a combination of radiation patterns of at least two antenna elements. Thus, the plurality of radiation patterns of the antenna are either individual radiation patterns of the antenna elements or are combinations of the individual radiation patterns.

Each antenna element—as a subunit of the antenna—comprises its own radiation pattern. At least some radiation patterns of the antenna elements differ from each other. In an embodiment, all radiation patterns differ from each other. The beamforming network decomposes the signals received by the antenna in decomposed signals where each decomposed signal is received either by a radiation pattern of one antenna element or by a combination of the radiation patterns of at least two antenna elements.

In an embodiment, the antenna elements are of one design and are, thus, identical to each other.

In one embodiment, the antenna elements of the plurality of antenna elements are all either right hand circularly polarized or left hand circularly polarized.

In an embodiment, the antenna elements of the plurality of antenna elements are located in a—common or joint—plane. Compare [1] for an example. In an embodiment, the antenna elements are printed antenna elements located and/or produced on the same substrate which becomes the common plane.

According to an embodiment, the evaluator is configured to estimate—additionally to the direction of arrival of the received signals—an inclination of a signal source emitting the signals received by the antenna. The inclination is relative e.g. to a normal plane or normal vector of the antenna. In one embodiment, the inclination—called $\rho$—of 0° implies that the signal source—with regard to its emitting characteristics—is parallel to a plane of the antenna. A value of 90°, i.e. $\rho=90°$, implies that the signal source is located perpendicular to this plane or that the signal source is parallel to a normal vector of this plane, for example, being a main direction of receiving signals. The inclination of the signal source is here also the inclination of its polarization.

The following embodiments refer to the information that allows the evaluator to estimate the direction of arrival and/or the inclination.

In an embodiment, the information describing signal receiving characteristics of the antenna refers to a position of a signal source emitting the signals received by the antenna relative to the antenna. The information used by the evaluator refers to the position of the signal source relative to the antenna.

In an embodiment, the information describing signal receiving characteristics of the antenna refers to a co-elevation and an azimuth describing the position of the signal source relative to the antenna. In this embodiment, the position of a signal source relative to the antenna is described by two angles: co-elevation and azimuth.

In one embodiment, the signal source is a satellite associated in an embodiment with an orbit. Such an orbit allows accordingly in one embodiment to set one angle to a fixed value, e.g. for the azimuth: $\varphi=0°$.

In an embodiment, the information describing signal receiving characteristics of the antenna refers to an inclination of the signal source relative to the antenna. In this embodiment, the inclination of the signal source is taken into account as it also effects the signals received by the antenna.

According to an embodiment, the information refers to the co-elevation and the azimuth describing the position and refers to the inclination of the signal source.

In an embodiment, the information describing signal receiving characteristics of the antenna comprises a set of steering vectors depending on angles (named $\theta$ for the co-elevation and $\varphi$ for the azimuth) describing the position of a signal source (or the direction from which the signal received by the antenna stems) relative to the antenna and depending on an angle describing an inclination of a polarization of the signal source relative to the antenna. Hence, the evaluation uses a set of steering vectors which are depending on three angles: two for the direction relative to the antenna (or more precisely to a plane and/or a normal vector of the antenna) and one for the inclination of the polarization of the signal source which is here called the inclination of the signal source.

In an embodiment, the set of steering vectors is based on dividing a range of possible inclinations (named by the angle $\rho$) of the signal source into partition intervals. The possible range of inclinations is in one embodiment given by $-90°<=\rho<=90°$ and in a different embodiment by $-180°<=\rho<=180°$. The range of inclinations is divided in this embodiment into partition intervals. The intervals define in one embodiment the resolution of the estimation of the evaluation as the inclinations angles within the intervals are not discriminated. Thus, each interval is associated with a reference inclination and with a certain width defining an interval of inclinations and a resolution of the estimation regarding the inclination.

Hence, in one embodiment, a width of the partition intervals is a measure for a resolution concerning an estimation of the inclination of the signal source. The intervals are associated with one reference inclination $\rho_{ref}$ for the respective interval. Hence, if an interval has a width of $\Delta\rho$, then no discrimination is done for inclinations $\rho$ within the range $(\rho_{ref}-\Delta\rho/2)<=\rho<=(\rho_{ref}+\Delta\rho/2)$. Thus, the resolution is given by the width of the respective partition.

In an embodiment, the partition intervals are set based on a projection similarity measure.

For defining the partition intervals, the following steps are performed:

for chosen reference values of the angles (named advantageously $\theta_{ref}$ and $\varphi_{ref}$) describing the position of a signal source relative to the antenna a reference inclination (named $\rho_{ref}$) is chosen as a reference steering vector, steering vectors—named A and being dependent on the three mentioned angles—belonging to same reference values of the angles (the values $\theta_{ref}$ and $\varphi_{ref}$) are projected on the reference steering vector, and wherein in case an obtained projection value lies within a given value interval, then the steering vectors are considered as identical.

The value interval is in one embodiment given by a lower threshold and by a upper limit of 1. Hence, if the projection is close to one, the steering vectors are almost identical to the reference steering vector and are, accordingly to an embodiment, considered to belong to the respective partition interval of the reference steering vector.

In an embodiment, steering vectors belonging to same reference values of the angles are projected on the reference steering vector and normalized for different inclination values. Thus, in this embodiment, also a normalization is performed for calculating the projection values. This is also relevant for defining the above mentioned value interval.

In an embodiment, the given value interval is given by a lower threshold and a value close to one. The upper value of 1 is especially based on the normalization of the inclination values.

In one embodiment, an overlap of partition values is reduced. Hence, the reference values and the width is set accordingly.

In an embodiment, the set of steering vectors to be used by a following subspace-based estimation such as MUSIC, ESPRIT, Maximum Likelihood, root-MUSIC, CAPON among others [7] for evaluating the decomposed received signals comprises steering vectors (named A) that a dependent on the positions angles (co-elevation $\theta$ and azimuth $\varphi$) of the signal source and reference inclinations ($\rho_{ref}$) defining partition intervals.

The partitions are used as the multibeam antenna (MBA) allows to estimate a source inclination just within an interval, i.e. its resolution. It was found that this resolution is different for each co-elevation angle $\theta$ (and the azimuth angle $\varphi$ in generic case). As a result, partitions are used in one embodiment to define the resolution capability of the MBA and they are used later on to form the spectrum indicating the source inclination. They are partitioning only the inclination ($\rho$) domain. In one embodiment, the partitions are not required for the estimation of $\theta$ and $\varphi$ in the case that the antenna has a uniform and very sharp resolution for them throughout their respective domains.

The partitions are constructed by an initial choice of a reference inclination value $\rho_{ref}$ after fixing each co-elevation (theta, $\theta$) and in the general case also the azimuth (phi, $\varphi$). Then, for keeping the co-elevation $\theta$ (and the azimuth $\varphi$) fixed, the steering vector $A(\rho)$ is projected on $A(\rho_{ref})$ for all rho values. This is a similarity measure referred and explained in the following.

Then, in one embodiment, it is checked for that $\theta$ (and $\varphi$), for which $\rho$ values, the similarity projection produces almost 1. For that $\rho$ interval (call it resolution), the steering vector $A(\rho_{ref})$ is used only in the spectrum and the processing of the received signals allow to tell if the received signal is within that rho interval or not, in terms of source inclination.

If there are some $\rho$ intervals that are not representable by that $A(\rho_{ref})$, a different $\rho_{ref}$ is selected accordingly and same procedure is applied. Other reference inclinations $\rho$ are selected according to the resolution, after first $\rho_{ref}$ produces it.

Thus, if need be, other reference inclination values $\rho_{ref}$ are found to yield similarity projection that covers all together above the threshold line for that $\theta$ (and $\varphi$). Studies have shown that the number of reference inclination values $\rho_{ref}$ depends on the characteristics of the antenna.

In short, inclination partitions are used for determining a resolution capability of the antenna in terms of source inclination. Together with this, spectra are built and used in one embodiment to estimate the direction of arrival and the inclination of the polarization. For this, a multibeam antenna is used, wherein the antenna is unique by having distinct axial ratio patterns in its partitions.

The object is also achieved by a method for estimating a direction of arrival.

The method comprises at least the following steps:

receiving signals emitted by a signal source with a circularly polarized antenna comprising a plurality of different radiation patterns, providing based on the received signals decomposed signals that are received by associated radiation patterns of the plurality of radiation patterns, and estimating the direction of arrival based on the decomposed signals and based on information describing signal receiving characteristics of the antenna.

The above discussed embodiments and features of the apparatus can also be realized via the method and vice versa.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
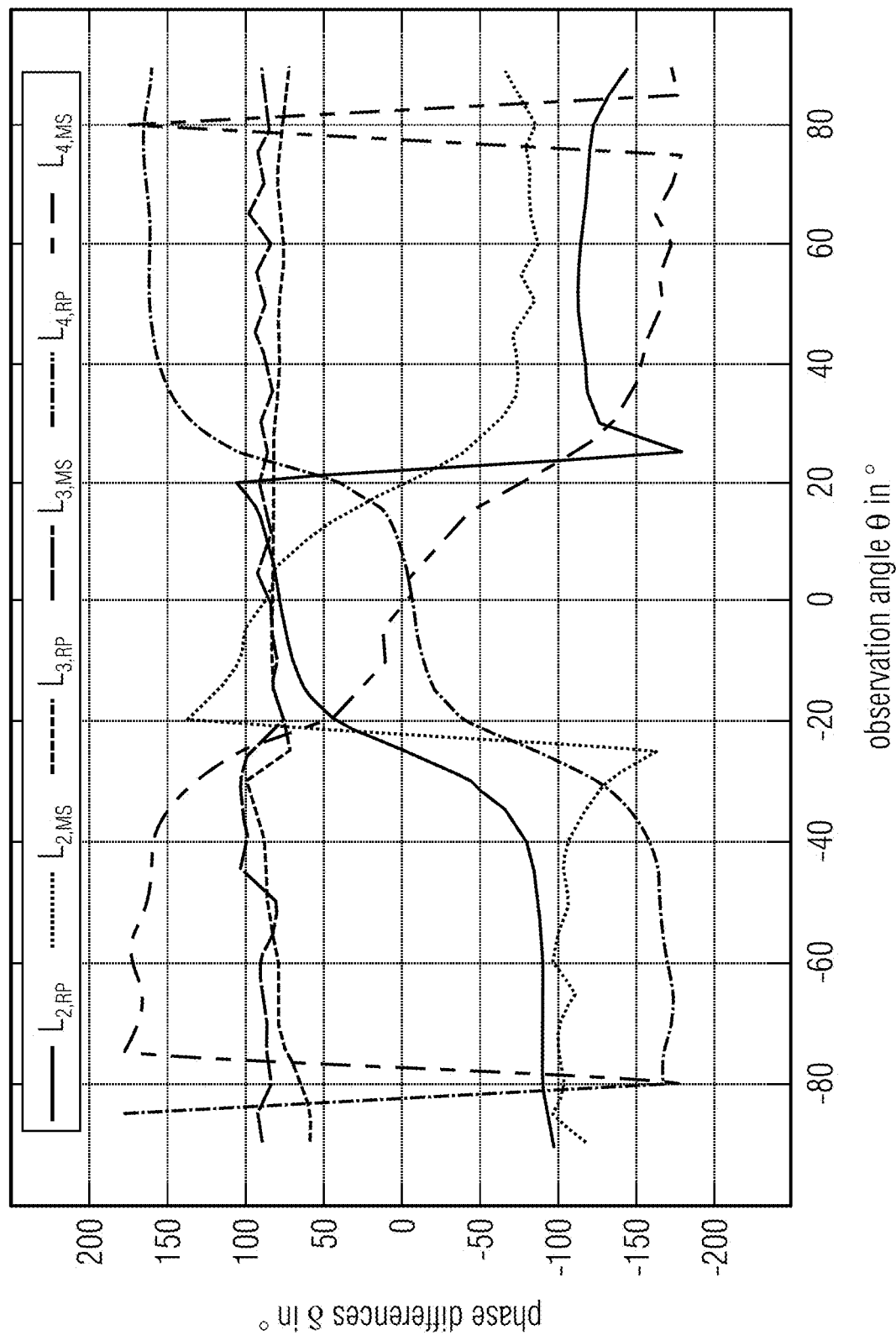
FIG. 1 shows a comparison between phase differences of lobes 2, 3 and 4 with respect to lobe 1 of a multibeam antenna.

FIG. 1 shows a comparison between phase differences of lobes 2, 3 and 4 with respect to lobe 1 of a multibeam antenna which is similar to the antenna given by [1]. Shown is on the x-axis the observation angle θ in ° and on the y-axis the phase differences δ in °. These phase differences are given for the lobes $L_2$, $L_3$, and $L_4$ with respect to the first lobe $L_1$ of the four beams of the multibeam antenna taught by [1] at an azimuth $\phi=0°$ and to an inclination $\rho=0°$. For each lobe two curves are shown: RP: source inclination $\rho=0°$ and MS: source inclination $\rho=90°$, respectively.

Figure 2:
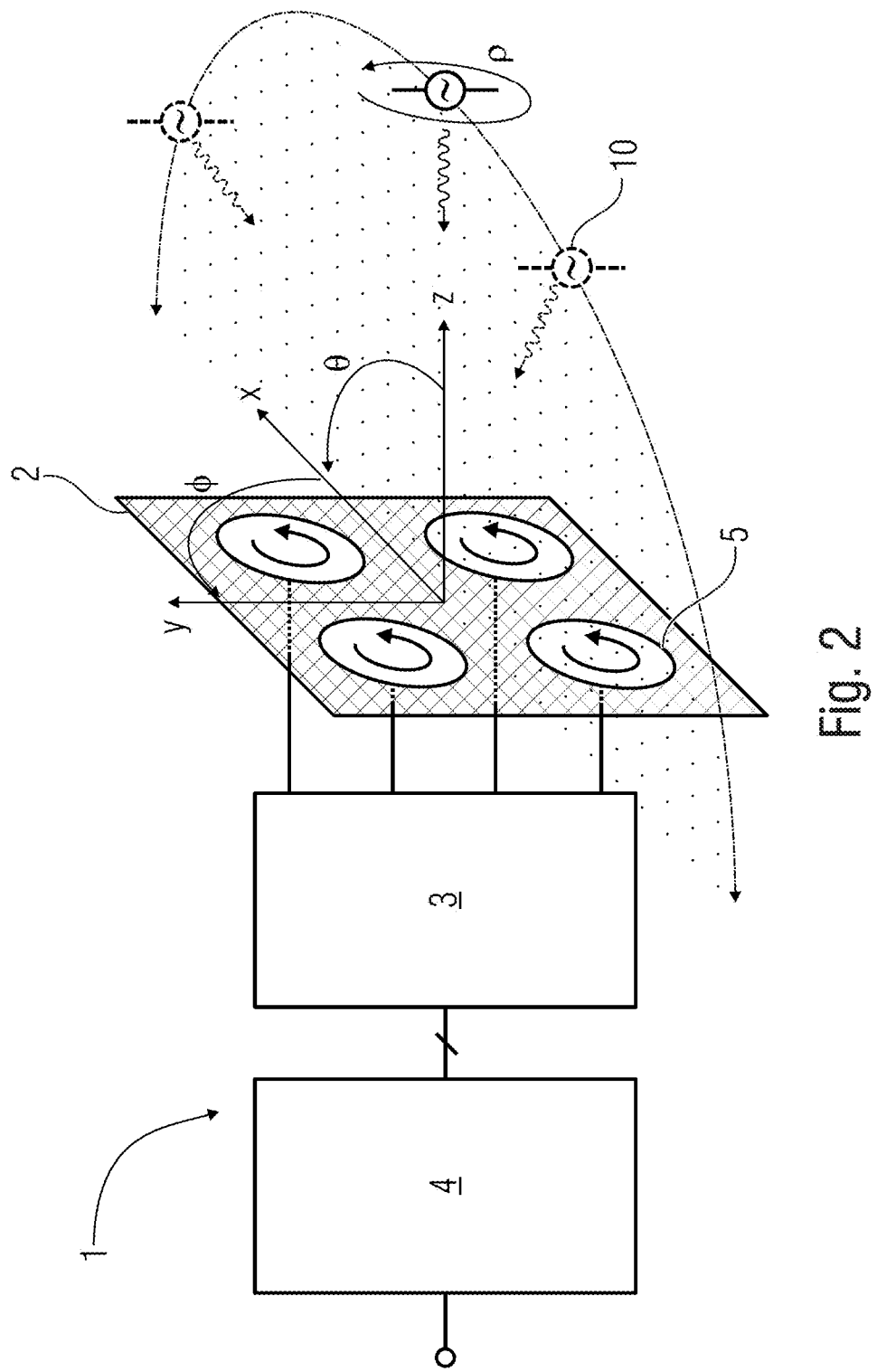
FIG. 2 illustrates an embodiment of the apparatus with a 2×2 mulitbeam antenna structure and the direction finding scenario including the signal source and its coordinates relation.

An embodiment of the apparatus 1 is shown in FIG. 2. In the apparatus 1, a multibeam antenna (MBA) 2 is utilized having diverse radiation patterns. The antenna elements 5 support only a single circular polarization: RHCP (in the shown embodiment) or LHCP. If the amplitude and phase response of the patterns are used in a subspace-based method, for instance, a direction of arrival (DoA) estimation of the source signal stemming from the signal source 10 is possible along with an estimation of the source leaning with inclination angle ρ of the signal source 10 relative to the antenna 2.

FIG. 2 shows the geometry by example of a 2-by-2 elements array providing here five beams, based on the antenna provided by [1] with 4 antenna elements 5: four beams are given by the radiation patterns of the four antenna elements and one beam is the result of the combination of the radiation patterns of the antenna elements. That all antenna elements 5 are right handed circularly polarized is indicated by the white arrows.

The array aperture is in the XY plane. The signal source 10 appears at arbitrary co-elevation and azimuth φ (here: φ=0°) and is arbitrarily oriented with respect to the receive array denoted by the inclination angle ρ. A beam-forming network (BFN) 3 provides the excitation vectors that may be used for forming the beam patterns, which can be selected via an RF switch (see FIG. 10). The resulting decomposed signals are processed by the evaluator 4.

The discussion in the following is based on the single source scenario depicted in FIG. 2 for φ=0°. The method is, however, generally applicable to every multibeam antenna and multiple sources.

The signal model reads $$\underbrace{\begin{bmatrix} x_1 \\ x_2 \\ x_3 \\ x_4 \\ x_5 \end{bmatrix}}_{x} = \underbrace{\begin{bmatrix} a_1(\theta_1, \rho_1) \\ a_2(\theta_1, \rho_1) \\ a_3(\theta_1, \rho_1) \\ a_4(\theta_1, \rho_1) \\ a_5(\theta_1, \rho_1) \end{bmatrix}}_{A} s_1 + \underbrace{\begin{bmatrix} n_1 \\ n_2 \\ n_3 \\ n_4 \\ n_5 \end{bmatrix}}_{N}, \quad (1)$$

where x is the vector of complex received signals, A is the complex responses of the lobes including the round trip phase difference of the signal, N is the vector of complex white Gaussian noise having a variance of $\sigma^2$ and $s_1$ is the complex source signal.

A covariance matrix is then formed. It is given by $$R = \overline{xx^H} = \overline{(As_1+N)(As_1+N)^H} = As_1 s_1^H A^H + \sigma^2 I \quad (2)$$

due to the fact that noise is uncorrelated with the signal.

Equivalently, there is $$R - \sigma^2 I = \|s_1\|^2 AA^H \quad (3)$$

The rest of the algorithm depends on the selection of the subspace-based method, which makes use of the covariance matrix defined above, so the following results are legitimate for any subspace-based estimation such as MUSIC, ESPRIT, Maximum Likelihood, root-MUSIC, CAPON among others [7].

For the estimation, the steering vectors A(θ, ρ) for each distinct θ and ρ may be used. This is for the discussed case φ=0°. Hence, in a general form, the steering vectors A(θ, φ, ρ) may be used.

The two orthogonal source polarization A(θ, 0°) and A(θ, 90°) are measured for −90°<θ<90° per each beam output. Using these two steering vectors, the rest follows from $$A_i(\theta, \rho) = [\cos(\rho) \; \sin(\rho)] \begin{bmatrix} A_i(\theta, 0°) \\ A_i(\theta, 90°) \end{bmatrix} \quad (4)$$

for the each beam i (in our example i=1, 2, 3, 4, 5). Then, steering vectors for an arbitrary source inclination ρ is obtained.

The fact is, as long as the steering vector covariance matrix $AA^H$ is considerably different for each value of ρ, the polarization sensitivity is achieved.

Assuming all the beams are perfectly RHCP for all θ range, then as the linearly polarized source leaning changes, the beam output signals are shifted with exactly the same phase, providing no change on the steering vector covariance matrix. As a result, the polarization sensitivity is not achieved.

However, different levels of achieved RHCP provides the sensitivity. This is where the multibeam antenna MBA 2 comes into action. Having an MBA yields an axial ratio pattern as exemplarily portrayed in FIG. 3 in which the axial ratios AR in dB for the five beams of the antenna 2 in FIG. 2 is shown. The AR is given depending on the observation angle θ in °.

Each beam or each sub-set of beams—if some beams repeat because of symmetry—has its unique axial ratio characteristics with respect to observation direction. This is peculiar to multibeam antennas and results in polarization sensitivity. Thus, a multibeam antenna as used in the apparatus provides a well resolved direction of arrival estimation characteristics and source inclination estimation.

Before the DoA estimation is done, the steering vector set matching the source inclination is needed. The set is in one embodiment obtained by measurements and is in a different embodiment obtained by measurements and by calculations based on these measurements.

In one embodiment, the range of possible source inclination ρ is divided into partitions. The partitioning intervals are arranged by a projection similarity measure. For a certain value $\theta=\theta_{ref}$, a reference $\rho_{ref}$ is selected, forming the reference steering vector. Then, all the steering vectors having the same $\theta_{ref}$ value is projected on the reference steering vector and normalized for different ρ values:

$$proj(\theta_{ref}, \rho) = \sqrt{\frac{A(\theta_{ref}, \rho)^H A(\theta_{ref}, \rho_{ref})}{\|A(\theta_{ref}, \rho)\| \|A(\theta_{ref}, \rho_{ref})\|}} . \quad (5)$$

This formula is given for φ=0°. The general formula is accordingly given for proj($\theta_{ref}$, $\varphi_{ref}$, ρ).

If the projection value is almost 1, the steering vectors can be considered identical. In practice, a lower boundary, i.e., a threshold, is selected for differentiating between steering vectors. Above the boundary, steering vectors are considered identical, below steering vectors are different. The threshold is selected with respect to axial ratio beamwidth, signal demodulation and noise; it should be close to 1, for example, 0.998.

Figure 3:
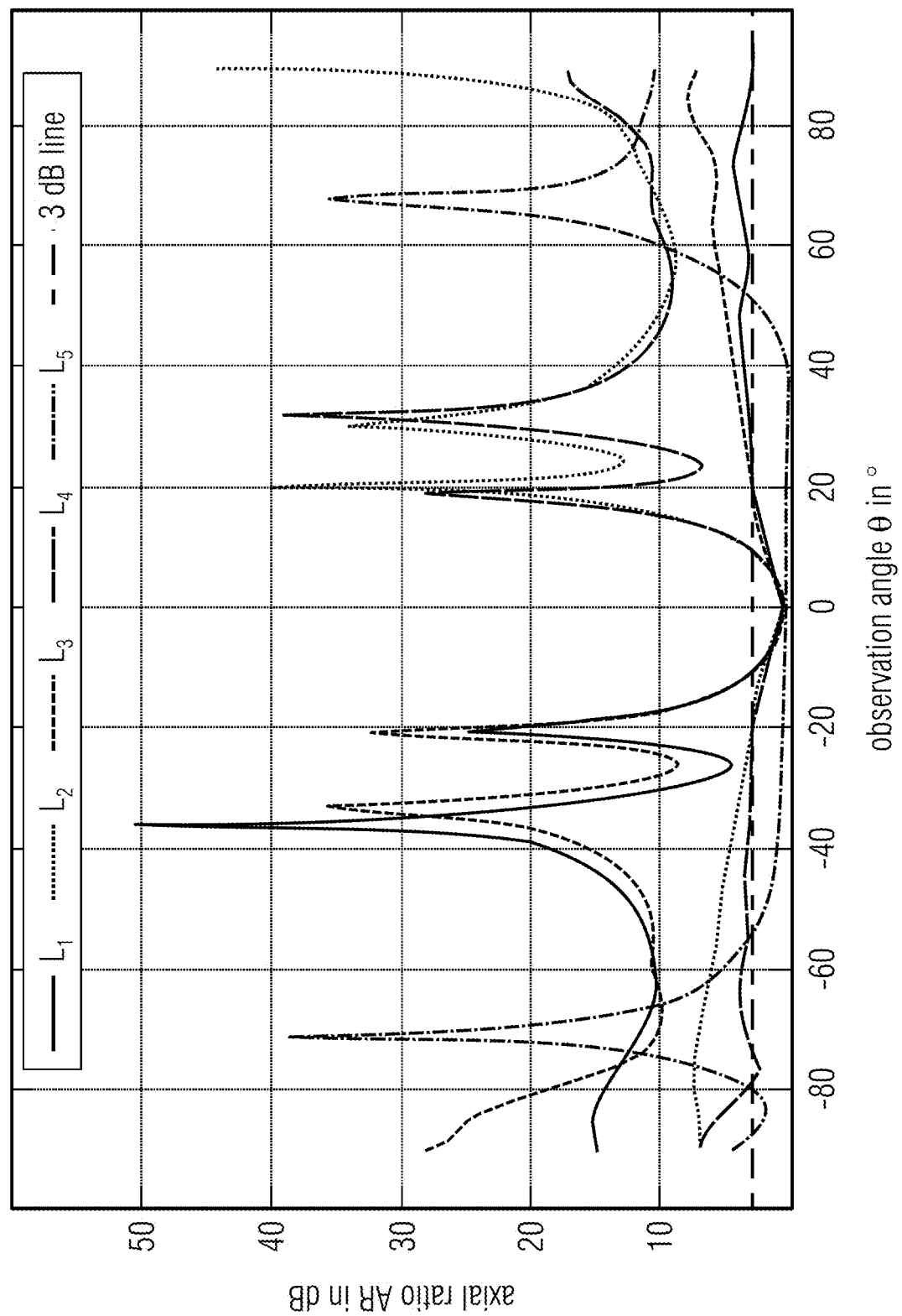
FIG. 3 shows example axial ratio values of the respective lobes $L_1$ to $L_5$ on the XZ plane.
Figure 4:
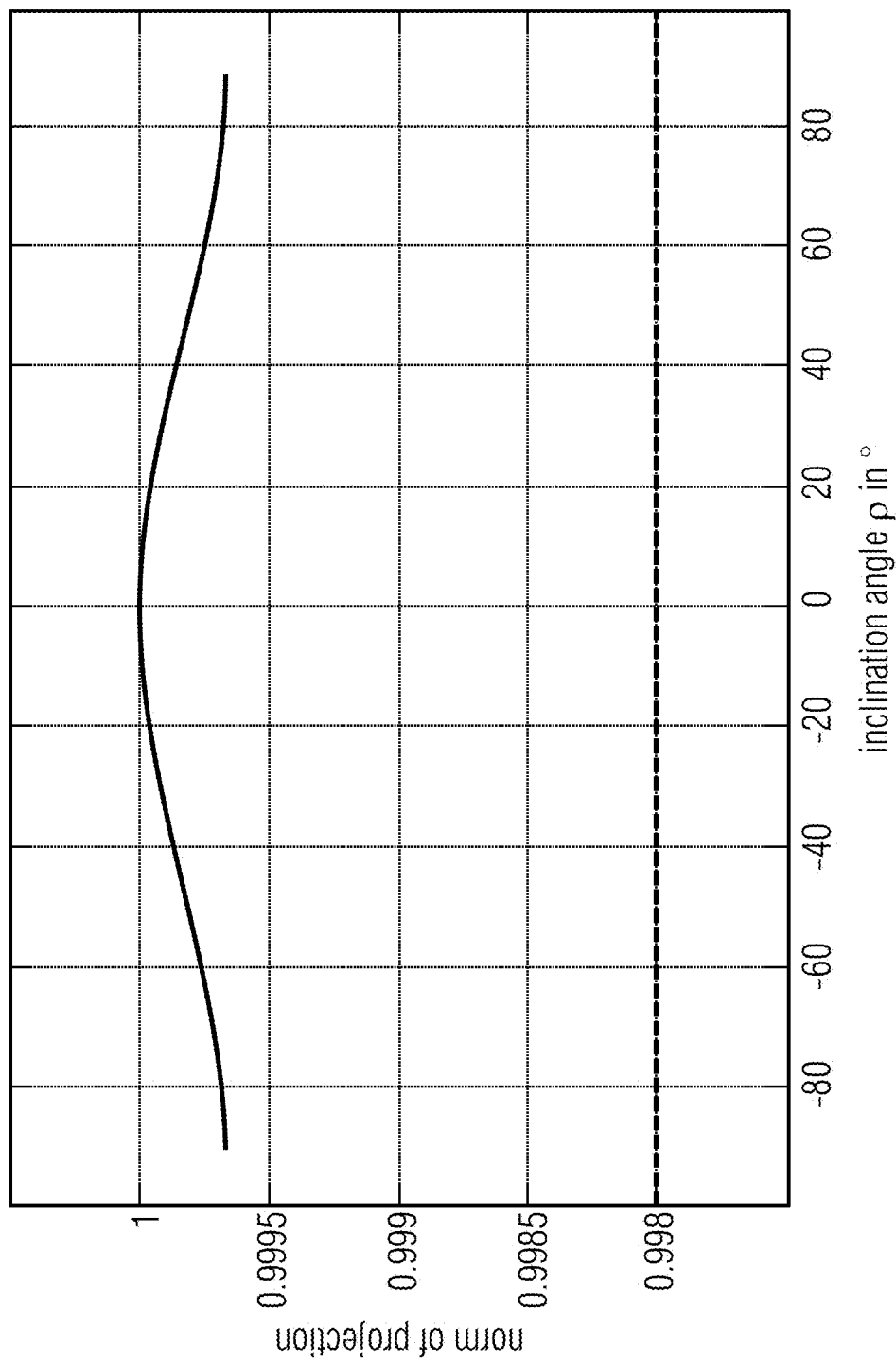
FIG. 4 shows the results of a projection of $A(0°, \rho)$ on the reference steering vector $A(0°, 0°)$ for $-90°<=\rho<=90°$.
Figure 5:
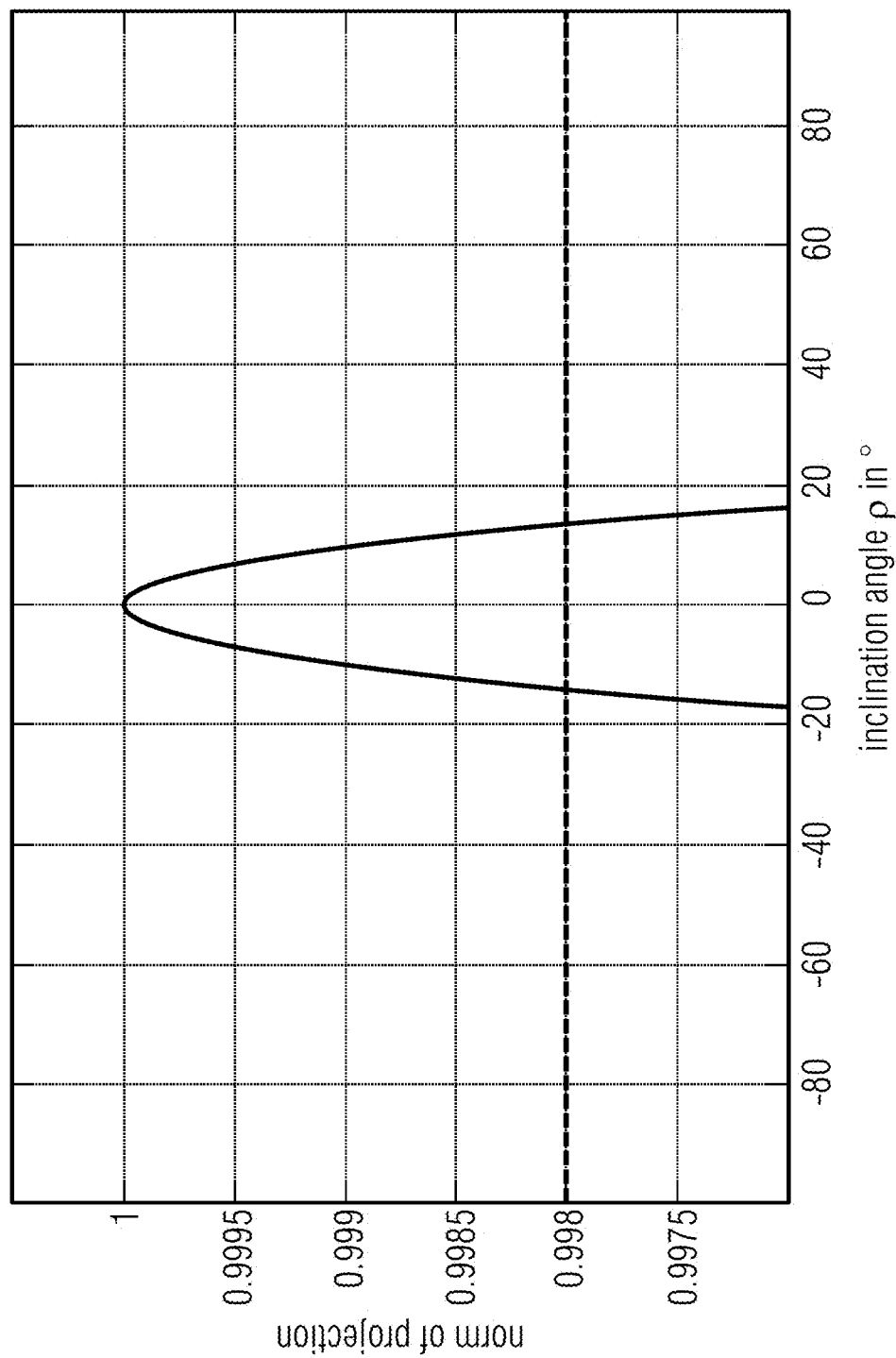
FIG. 5 shows the results of a projection of $A(20°, \rho)$ on the reference steering vector $A(0°, 0°)$ for $-90°<=\rho<=90°$.
Figure 6:
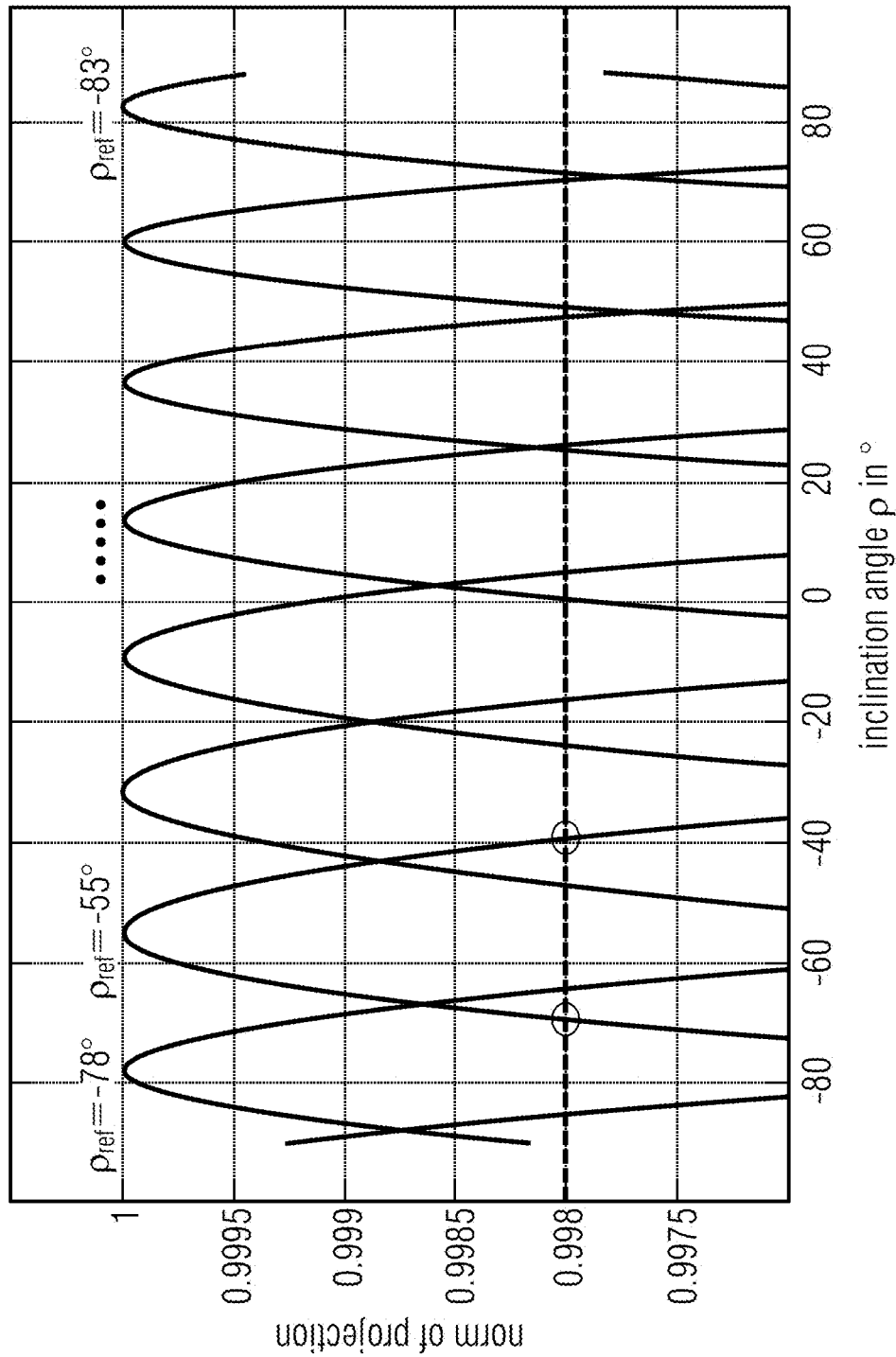
FIG. 6 shows the results of a projection of $A(20°, \rho)$ on $A(0°, \rho_{ref}0°)$ for $\rho_{ref}$ belonging to the set {−78°, −55°, −32°, −9°, 14°, 37°, 60°, 83°)

Towards normal direction of the MBA, the projection is close to 1 independent of ρ as shown in FIG. 4 for $\rho_{ref}=0°$ because of the absence of polarization sensitivity (compare FIG. 3). In FIGS. 4 to 6 the norm of projection is shown in dependency on the inclination angle ρ in °.

As the co-elevation θ values get larger, there appears an immediate polarization sensitivity (axial ratio diversity) for some partitions. In FIG. 5, the situation is demonstrated by taking $\theta_{ref}=20°$ and $\rho_{ref}=0°$ for which, there is a polarization sensitivity having a 30° resolution. FIG. 5 also shows that the resolution is about +−17° and the partition interval will have accordingly a width of about 34°. The resolution is here given by the values for the norm of projection greater than 0.998, i.e. close enough to the value of the reference inclination.

Assuming, for the time being, the resolution is identical for all $\rho_{ref}$, the range of inclination angles ρ can be divided into equidistant partitions, as shown in FIG. 6. For θ=20° eight partitions are expected to cover the area above the threshold line. The resolution interval boundaries are indicated by two circles.

In the example, the following steering vectors were used: A(20°, −78°), A(20°, −55°), A(20°, −32°), A(20°, −9°), A(20°, 14°), A(20°, 37°), A(20°, 60°), and A(20°, 83°).

The selection is made in one embodiment regarding to this similarity projection method for the other instances of θ and ρ. For the interval having no polarization sensitivity, only a single steering vector, i.e., a single partition, is used for forming the spectrum. This fact decreases the number of comparisons that may be used.

After determining the steering reference vectors that may be used and after partitioning the p spectrum for each θ (and ϕ), the estimation can be initiated with any subspace based method. The number of partitions, which directly corresponds to the polarization sensitivity of the MBA, increases as θ increases.

In the following table, a sample partitioning for the given MBA of the embodiment of the apparatus of FIG. 2 is demonstrated, which is formed using equidistant approach with some overlapping. Here, for the sake of simplicity, the azimuth is still given by φ=0°.

| θ Values | Number of ρ Partitions |
| --- | --- |
| [−2°, 2°] | 1 |
| [−7°, −3°] ∪ [3°, 7°] | 2 |
| [−12°, −8°] ∪ [8°, 12°] | 4 |
| [−17°, −13°] ∪ [13°, 17°] | 6 |
| [−22°, −18°] ∪ [18°, 22°] | 8 |
| [−27°, −23°] ∪ [23°, 27°] | 8 |
| [−32°, −28°] ∪ [28°, 32°] | 10 |
| [−37°, −33°] ∪ [33°, 37°] | 10 |
| [−42°, −38°] ∪ [38°, 42°] | 10 |
| [−47°, −43°] ∪ [43°, 47°] | 10 |
| [−52°, −48°] ∪ [48°, 52°] | 12 |
| [−57°, −53°] ∪ [53°, 57°] | 12 |
| [−62°, −58°] ∪ [58°, 62°] | 14 |
| [−67°, −63°] ∪ [63°, 67°] | 16 |
| [−72°, −68°] ∪ [68°, 72°] | 18 |
| [−77°, −73°] ∪ [73°, 77°] | 22 |
| [−82°, −78°] ∪ [78°, 82°] | 26 |
| [−87°, −83°] ∪ [83°, 87°] | 34 |

The table gives example numbers of steering vector ρ partitions for the given range of the co-elevation θ (here: the azimuth ϕ is set to 0°).

As seen in FIG. 6, for some steering vectors there appears an overlapping above the threshold line as a consequence of the equidistant partitioning. The resolution at the respective steering vectors could therefore be doubled in the worst case, as the estimator favors one of the ρ intervals in the spectrum while yielding a coarse estimation of the source polarization. By having nonequidistant partitioning, there exists no overlapping as well, hence the MBA achieves a nonoverlapping and a bounded resolution capability. In short, the method yields a guide on how to select the reference partitioning steering vector set, having the constraint of covering all the field above the threshold line.

Using the MUSIC algorithm for the verification, some test results are presented to show the capability of multibeam antenna to resolve the direction of arrival of signals together with the increasing sensitivity to source inclination ρ as the co-elevation θ increases.

Figure 7A:
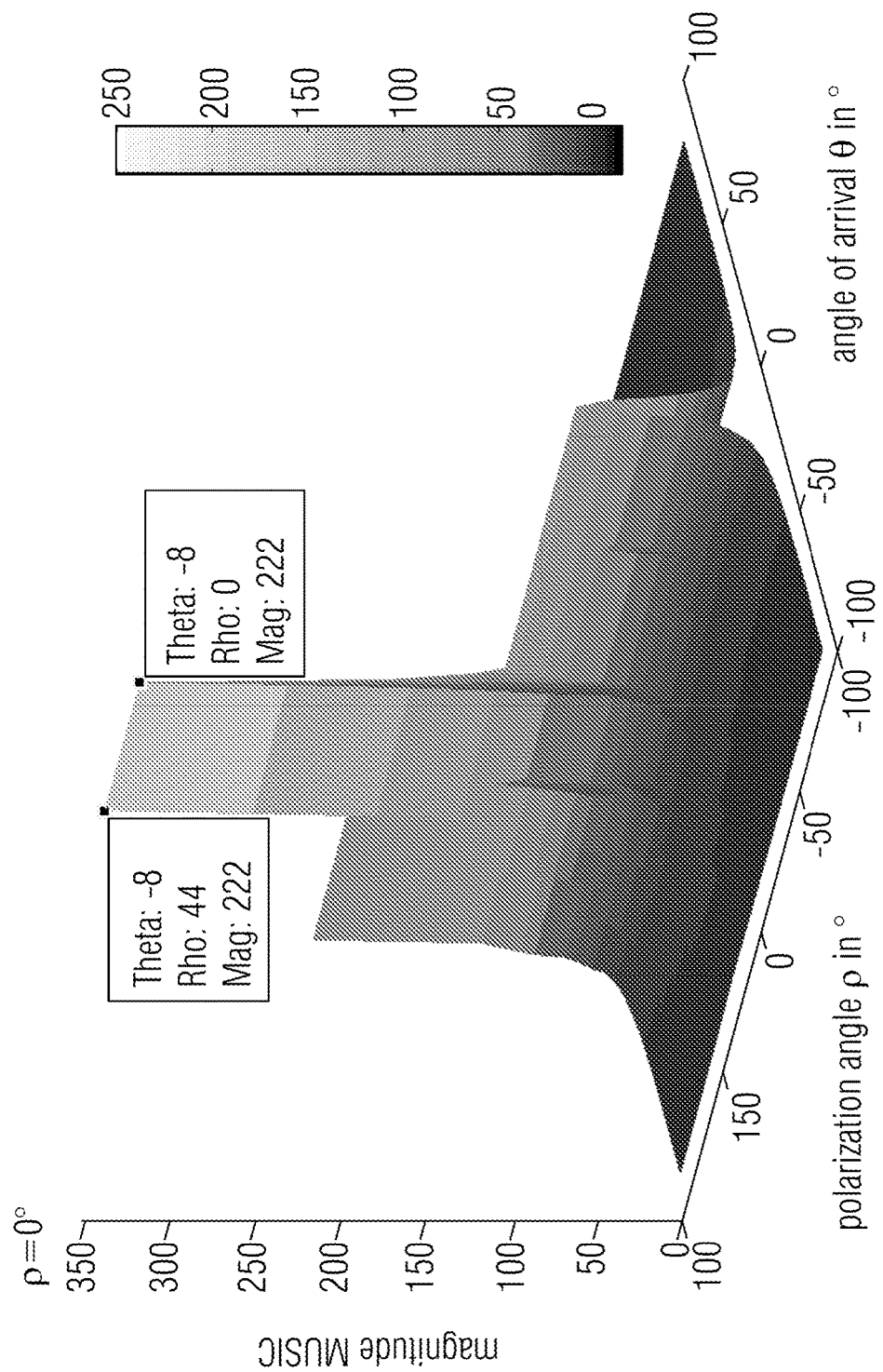
FIGS. 7A-C shows three spectra for distinct source inclinations: a) $\rho=0°$, b) $\rho=45°$, and c) $\rho=90°$ at $\theta=-5°$.
Figure 7B:
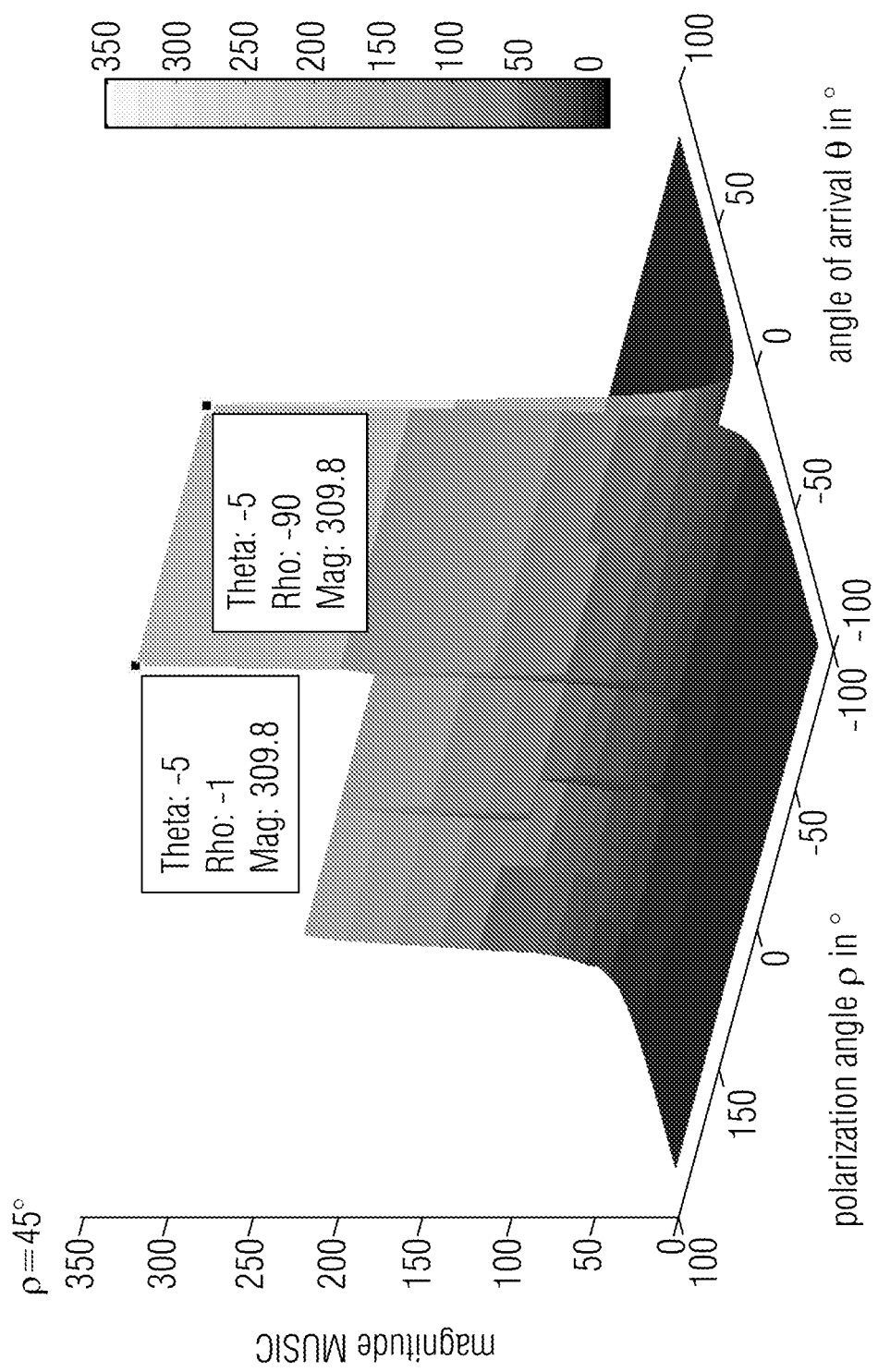
Figure 7C:
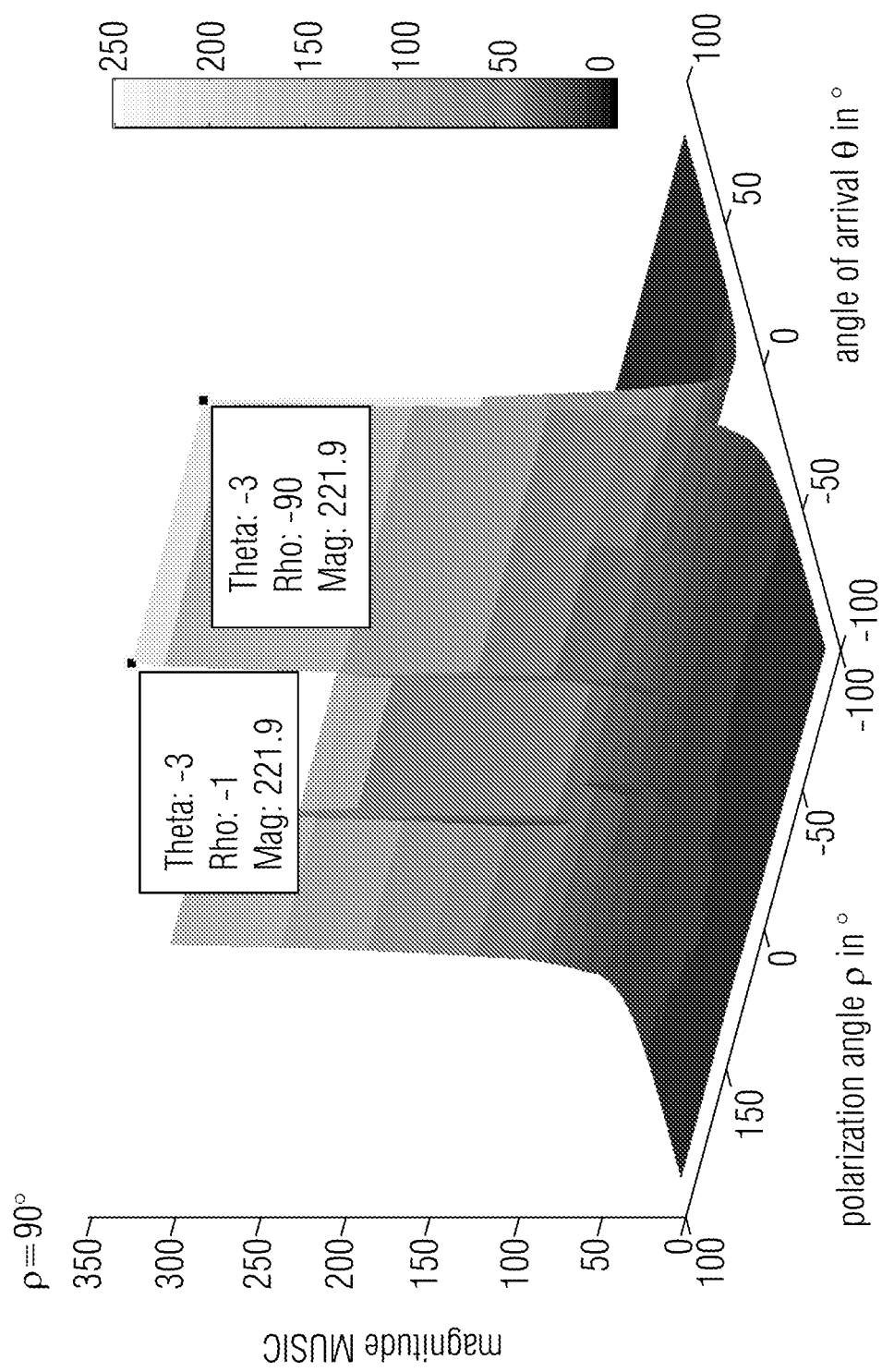

FIGS. 7A-C demonstrates the output of the partitioned spectrum with the source being placed at −5° and for three different inclinations: ρ=0°, 45°, and 90°.

Figure 8A:
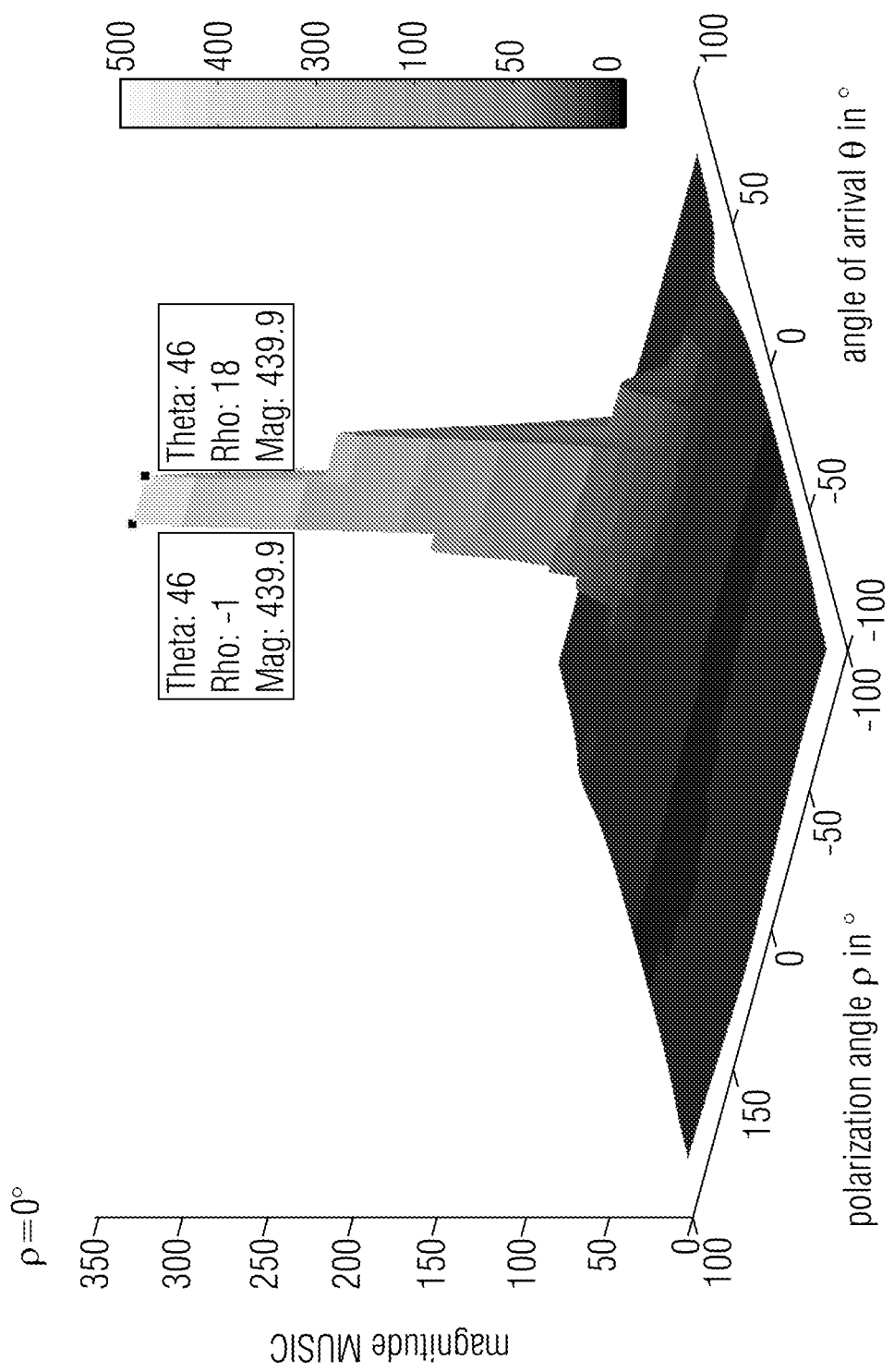
FIGS. 8A-C shows three spectra for distinct source inclinations: a) $\rho=0°$, b) $\rho=45°$, and c) $\rho=90°$ at $\theta=50°$.
Figure 8B:
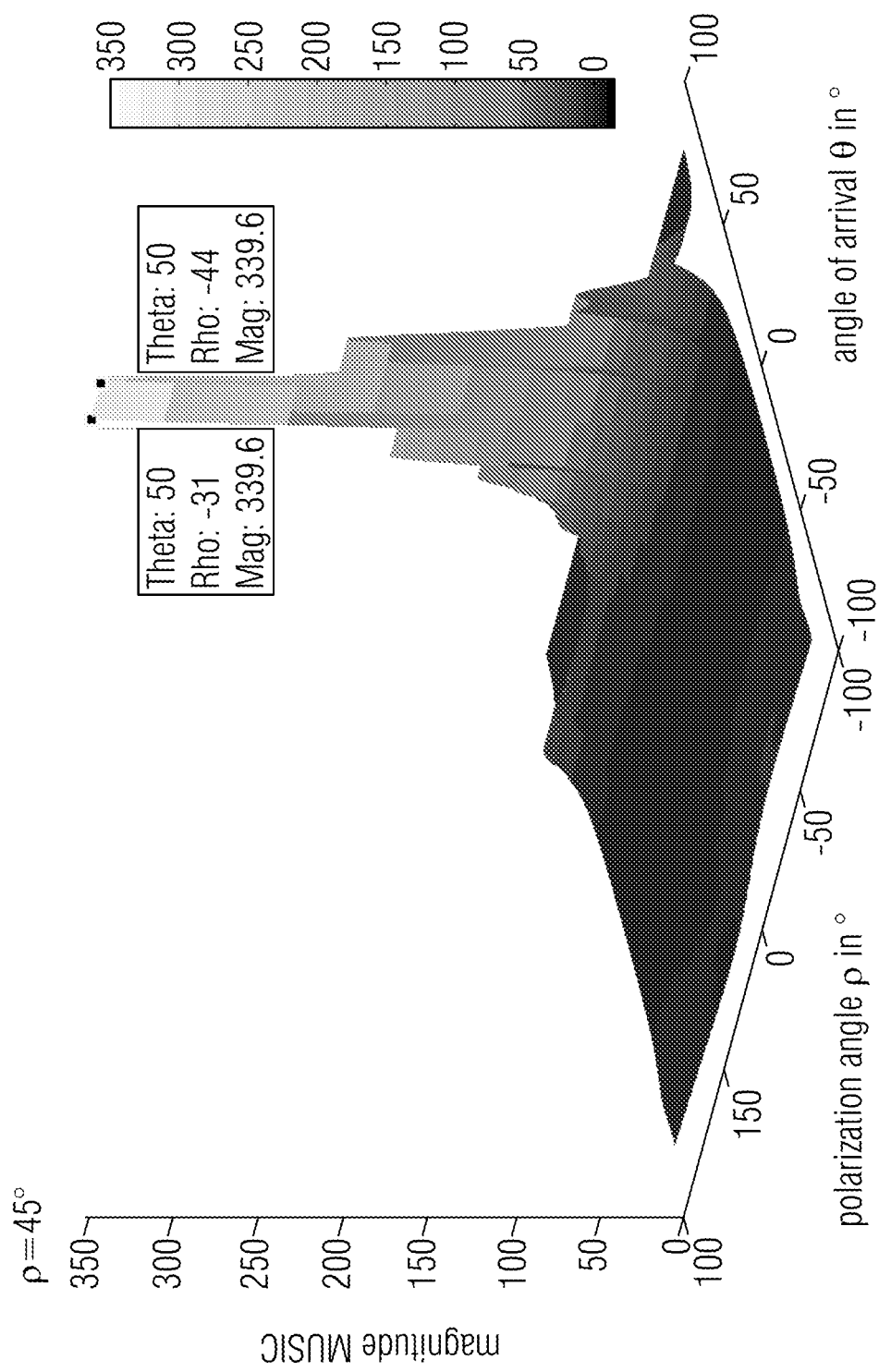
Figure 8C:
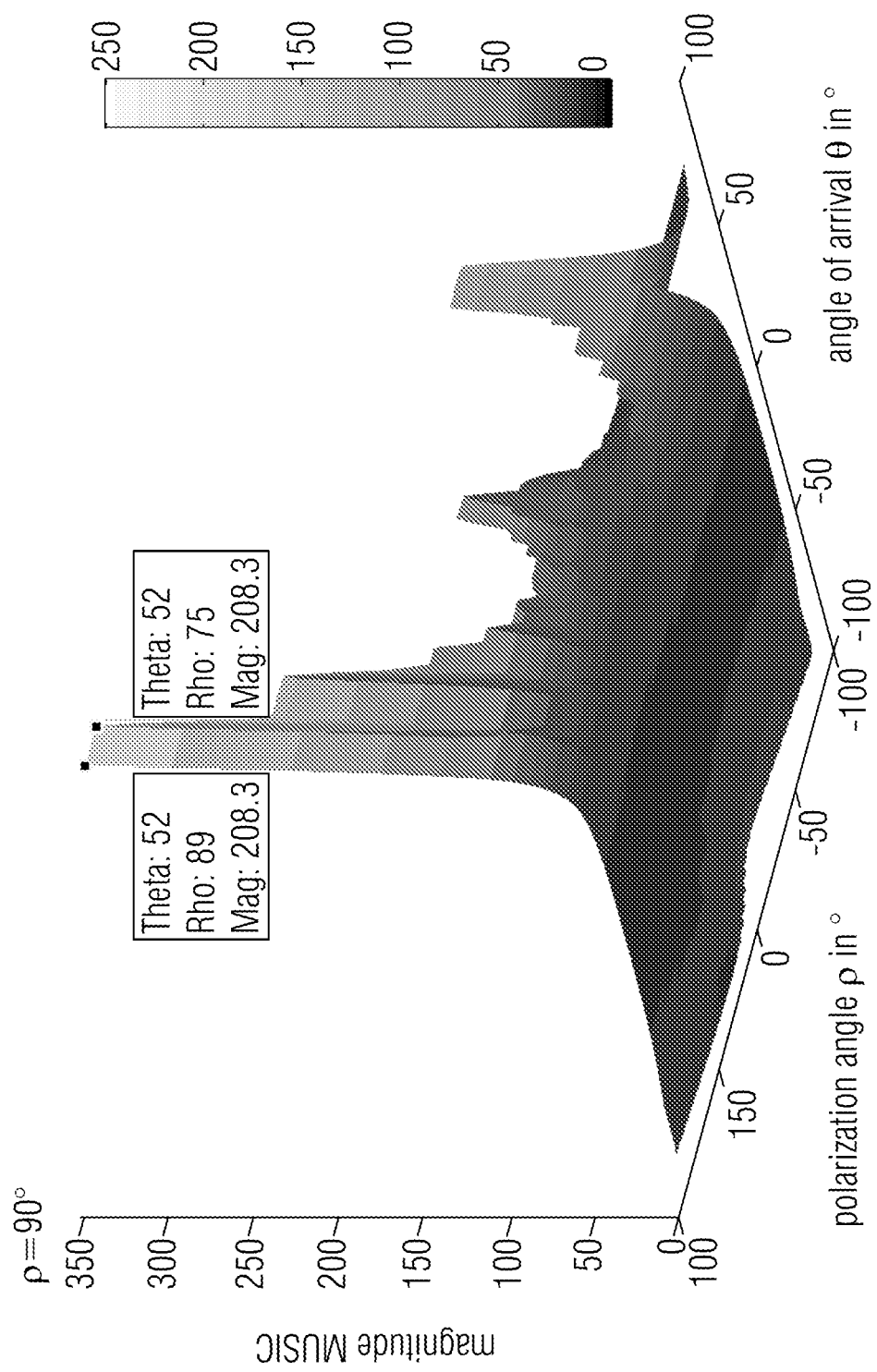

FIGS. 8A-C demonstrates the result for the same source inclination set when the source is placed at co-elevation θ=50°.

In both figures, FIGS. 7A-C and FIGS. 8A-C, it can be seen that the range of possible inclinations ρ is divided into different partitions. Hence, the spectrum obtained by processing the decomposed signals with regard to their amplitudes and phases and using the set of steering vectors describing the spatial distribution of the signal receiving sensitivity of the different radiation patterns and describing effects of an inclination of the signal source is analyzed based on the different partitions with regard to the inclination of the signal source. The further processing is done by any subspace-based method according to the state of art, e.g. MUSIC.

The results supports that the MBA achieves the polarization sensitivity together with its axial ratio pattern. There appears a very good accuracy on direction of arrival estimation, together with the partitioned source inclination estimation. An aspect here is that, the MBA suppresses the high axial ratio angles of the beams with its smaller amplitude responses at those angles, which acts like a weighting, yielding a polarization sensitivity together with a more robust direction of arrival estimation, thus using only RHCP beams without any secondary polarization pattern.

Figure 9:
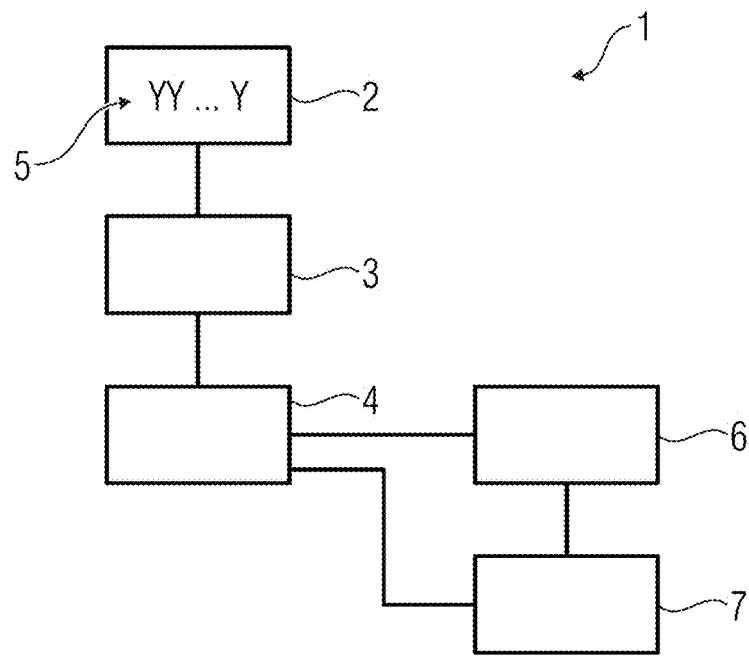
FIG. 9 shows a different embodiment of the apparatus and FIG. 10 shows another embodiment of the apparatus.

An embodiment of an apparatus 1 for DoA and polarisation estimation is portrayed in FIG. 9.

The "Antenna Array" 2 with different antenna elements 5 connects to an beam forming network (BFN) 3—e.g. realized by a Butler matrix—which decomposes the received antenna signals into decomposed signals. The estimation is performed in the "Signal Processing" device or evaluator 4. The steering vector set of the respective antenna 2 obtained from measurement or simulation is provided via a storage unit 6. The evaluator 4 provides estimations for the direction of arrival and the inclination ρ of the polarization of the signal source. A controller 7 controls the apparatus 1. The separation of the BFN and the Signal Processing is logical. The BFN can be also part of the Signal Processing unit, representing a digital signal decomposition.

Figure 10:
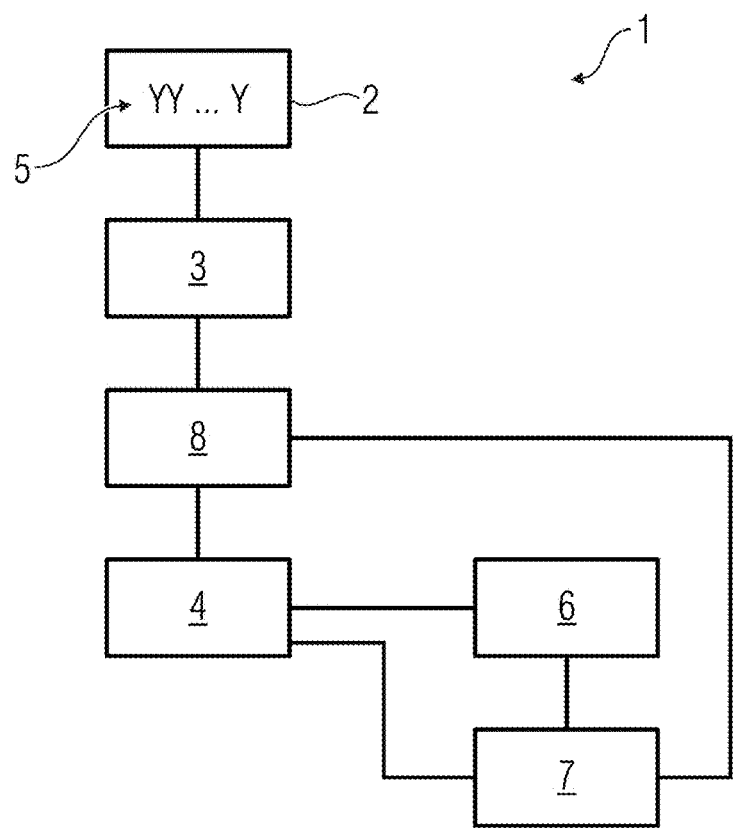

Another embodiment of the apparatus 1 for DoA and polarization estimation is portrayed in FIG. 10.

The "Antenna Array" 2 with antenna elements 5 (having all the same circular polarization) connects to an BFN 3, which decomposes the antenna signals into decomposed signals. In contrast to the embodiment in FIG. 9, only one decomposed signal is selected at an instant of time via a switch unit 8. Supposing an analogue implementation of the BFN 3 and the switch unit 8, this allows for reducing the number of signal branches to one. The selection of the signal is controlled by the controller 7. It ensures a time-synchronous switching. The estimation is performed in the evaluator 4. The steering vector set of the respective antenna 2 is provided by the storage unit 6. The separation of the beam forming network 3, the switch unit 8, and the evaluator 4 is logical. The BFN 3 and the switch unit 8 are in a different embodiment part of the evaluator 4, representing a digital signal decomposition and selection.

The provided apparatus and method provide at least the following benefits:

Reduced costs for implementation as single polarization involves only a single signal branch for each element, halving the effort compared to dual polarized solutions.

Because of the diverse patterns, the DoA and the polarization (inclination, orientation) of the source signal can be concurrently estimated using an array with one polarization.

Applying partitioning of the range of inclination angles reduces the signal processing effort for estimation, allowing for usage of cheaper processing platforms such as microcontrollers (e.g. ARM family) or digital signal processors.

Possible application areas are:

Direction and orientation estimation of radio transmitters/transponders such as RFID transponders, wireless sensors, mobile devices (e.g. mobile phones, laptops, tablet computers), vehicles, aircrafts.

Direction finding for military purpose and security (radio reconnaissance).

Sensor applications: determination of inclination/positioning/orientation

Although some aspects have been described in the context of an apparatus, it is clear that these aspects also represent a description of the corresponding method. Analogously, aspects described in the context of a method step also represent a description of a corresponding block or item or feature of a corresponding apparatus.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein.

The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] L. Weisgerber and A. E. Popugaev, "Multibeam antenna array for RFID applications," in 2013 European Microwave Conference (EuMC), Nuremberg, Germany, Oct. 10-16, 2013, pp. 84-87.

[2] K. A. Gotsis, K. Siakavara, and J. N. Sahalos, "On the direction of arrival (doa) estimation for a switched-beam antenna system using neural networks," IEEE Transactions on Antennas and Propagation, vol. 57, no. 5, pp. 1399-1411, May 2009.

[3] W. X. Sheng, J. Zhou, D. G. Fang, and Y. C. Gu, "Super-resolution DOA estimation in switch beam smart antenna," in Proc. 5th Int. Symp. Antennas, Propagation and EM Theory ISAPE 2000, August 2000, pp. 603-606.

[4] L. Weisgerber and A. E. Popugaev, "Antenna concepts for DoA estimation in traffic scenarios," in Proc. IEEE-APS Topical Conf. Antennas and Propagation in Wireless Communications (APWC), August 2014, pp. 423-426.

[5] R. Schmidt, "Multiple emitter location and signal parameter estimation," IEEE Transactions on Antennas and Propagation, vol. 34, no. 3, pp. 276-280, March 1986.

[6] Y. Han, Q. Fang, F. Yan, M. Jin, and X. Qiao, "Joint DOA and polarization estimation for unequal power sources based on reconstructed noise subspace," Journal of Systems Engineering and Electronics, vol. 27, no. 3, pp. 501-513, June 2016.

[7] J. Foutz, A. Spanias, and M. K. Banavar, Narrowband Direction of Arrival Estimation for Antenna Arrays, ser. Synthesis Lectures on Antennas #8. Morgan & Claypool, 2008.

The invention claimed is:

1. Apparatus for estimating a direction of arrival,
wherein the apparatus comprises an antenna, a beamforming network, and an evaluator,
wherein the antenna is configured to receive signals,
wherein the antenna is circularly polarized,
wherein the antenna comprises a plurality of different radiation patterns,
wherein the beamforming network is configured to provide based on signals received by the antenna decomposed complex signals that are received by associated radiation patterns of the plurality of radiation patterns,
wherein the evaluator is configured to use the amplitude and phase response of the different radiation patterns to estimate the direction of arrival and an inclination of the signal source relative to the antenna based on the decomposed complex signals and based on information describing signal receiving characteristics of the antenna, and
wherein the information describing signal receiving characteristics of the antenna comprises a set of steering vectors depending on angles describing the position of a signal source emitting the signals received by the antenna relative to the antenna and depending on an angle describing an inclination of a polarization of the signal source relative to the antenna.

2. Apparatus of claim 1,
wherein the antenna is either right hand circularly polarized or left hand circularly polarized.

3. Apparatus of claim 1,
wherein the antenna comprises a plurality of antenna elements,
wherein the antenna elements of the plurality of antenna elements comprise different radiation patterns, and
wherein the beamforming network is configured to provide the decomposed complex signals so that the decomposed complex signals are received with radiation patterns of individual antenna elements or with a combination of radiation patterns of at least two antenna elements.

4. Apparatus of claim 3,
wherein the antenna elements of the plurality of antenna elements are all either right hand circularly polarized or left hand circularly polarized.

5. Apparatus of claim 3,
wherein the antenna elements of the plurality of antenna elements are located in a plane.

6. Apparatus of claim 1,
wherein the evaluator is configured to estimate an inclination of a signal source emitting the signals received by the antenna.

7. Apparatus of claim 1,
wherein the information describing signal receiving characteristics of the antenna refers to a co-elevation and an azimuth describing the position of the signal source relative to the antenna.

8. Apparatus of claim 1,
wherein the information describing signal receiving characteristics of the antenna refers to an inclination of the signal source relative to the antenna.

9. Apparatus of claim 1,
wherein the set of steering vectors is based on dividing a range of possible inclinations of the signal source into partition intervals.

10. Apparatus of claim 9,
wherein a width of the partition intervals is a measure for a resolution concerning an estimation of the inclination of the signal source.

11. Apparatus of claim 9,
wherein the partition intervals are set based on a projection similarity measure,
wherein for chosen reference values of the angles describing the position of a signal source relative to the antenna a reference inclination is chosen as a reference steering vector,
wherein steering vectors belonging to same reference values of the angles are projected on the reference steering vector, and
wherein in case an acquired projection value lies within a given value interval, then the steering vectors are considered as identical.

12. Apparatus of claim 11,
wherein steering vectors belonging to same reference values of the angles are projected on the reference steering vector and normalized for different inclination values.

13. Apparatus of claim 11,
wherein the given value interval is given by a lower threshold and a value close to one.

14. Method for estimating a direction of arrival, comprising:
receiving signals emitted by a signal source with a circularly polarized antenna comprising a plurality of different radiation patterns,
providing based on the received signals decomposed complex signals that are received by associated radiation patterns of the plurality of radiation patterns, and using the amplitude and phase response of the different radiation patterns to
estimate the direction of arrival and an inclination of the signal source relative to the antenna based on the decomposed complex signals and based on information describing signal receiving characteristics of the antenna, and
wherein the information describing signal receiving characteristics of the antenna comprises a set of steering vectors depending on angles describing the position of a signal source emitting the signals received by the antenna relative to the antenna and depending on an angle describing an inclination of a polarization of the signal source relative to the antenna.

* * * * *